United States Patent [19]

Nordstrom et al.

[11] 4,137,277

[45] Jan. 30, 1979

[54] POWDER PAINT WITH EPOXY AND AMIDE COPOLYMER WITH CARBOXY TERMINATED CROSSLINKING AGENT

[75] Inventors: John D. Nordstrom, Detroit; Stephen C. Peng, Utica, both of Mich.

[73] Assignee: Ford Motor Company, Dearborn, Mich.

[21] Appl. No.: 552,518

[22] Filed: Feb. 24, 1975

Related U.S. Application Data

[63] Continuation-in-part of Ser. No. 394,875, Sep. 6, 1973, abandoned.

[51] Int. Cl.$^2$ .............................................. C08G 59/42
[52] U.S. Cl. ..................................... 260/835; 260/836
[58] Field of Search ............... 260/78.4 D, 830 R, 835, 260/836

[56] References Cited

U.S. PATENT DOCUMENTS

| | | | |
|---|---|---|---|
| 3,758,632 | 9/1973 | Labana | 260/836 |
| 3,781,380 | 12/1973 | Labana | 260/836 |

Primary Examiner—Paul R. Michl
Attorney, Agent, or Firm—Olin B. Johnson; Keith L. Zerschling

[57] ABSTRACT

Improved powder coating compositions are disclosed which comprise a particulate mixture of (1) a qualitatively difunctional copolymer of about 5 to about 20 weight percent of a glycidyl ester of a monoethylenically unsaturated acid, about 2 to about 10 weight percent of an alpha-beta olefinically unsaturated amide selected from acrylamide and methacrylamide and about 70 to about 93 weight percent monoethylenically unsaturated monomers consisting essentially of monofunctional monomers selected from the groups consisting of esters of a $C_1 - C_8$ monohydric alcohol and acrylic acid, esters of a $C_1 - C_8$ monohydric alcohol and methacrylic acid and $C_8 - C_{12}$ monovinyl hydrocarbons, and (2) a carboxy-functional crosslinking agent is a carboxy-terminated compound selected from the group consisting of esters of a diepoxide and a dicarboxylic acid and carboxy-terminated, saturated polyesters.

4 Claims, No Drawings

POWDER PAINT WITH EPOXY AND AMIDE COPOLYMER WITH CARBOXY TERMINATED CROSSLINKING AGENT

This application is a Continuation-In-Part of application Ser. No. 394,875 filed Sept. 6, 1973 now abandoned.

BACKGROUND OF THE INVENTION

Powder coating compositions are extremely desirable for use in painting substrates in that they are essentially free of organic solvents conventionally utilized in liquid paint systems. Thus, they give off little, if any, volatile material to the environment when heat cured.

Powder coatings comprising (1) a copolymer of a glycidyl acrylate and other monofunctional olefinically unsaturated monomers, (2) a carboxy-terminated polymer crosslinking agent and (3) a polymeric flow control agent were heretofore described in U.S. Pat. No. 3,781,380.

THE INVENTION

It now has been discovered that powder coating compositions having unexpected advantages relative to the aforedescribed powder coating compositions can be obtained by making the copolymer both epoxy-functional and amide-functional. This is accomplished by including about 2 to about 10 weight percent of an alpha-beta olefinically unsaturated amide selected from acrylamide and methacrylamide and about 5 to about 20 weight percent of a glycidyl ester of a monoethylenically unsaturated monomer which makes up the rest of the copolymer, the latter comprising about 70 to about 93 weight percent of the copolymer.

The dual functionality, aside from its crosslinking capabilities, provides additional polarity to the copolymer. In the mixing of the copolymer with the crosslinking agent to form a homogeneous powder mix, this additional polarity provides better compatibility between powder components and admits of a more homogeneous mixture and hence more uniform crosslinking on the substrate surface. It may also aid in pigment dispersion. These powders are effectively processed by spray drying. They resist phase separation. They may also be processed by melt blending and vacuum drying techniques. They are easily and effectively mixed by extrusion or mill rolling. Further, the need for an antistatic agent is eliminated when a film depth of less than 3 mills (0.003 inch) is to be applied. The coatings obtained therefrom exhibit good solvent resistance to conventional organic solvents and also exhibit good adhesion to the substrate.

Except in those instances wherein a specific compound is named, the term "acrylate" is used in this specification to include esters of both acrylic and methacrylic acid, i.e., acrylates and methacrylates.

DETAILED DESCRIPTION OF THE INVENTION

Epoxy and amide functional copolymers suitable for use in the powder coating materials of this invention are readily formed by conventional free radical polymerization of suitable alpha-beta olefinically unsaturated monomers. These copolymers having both epoxide groups and amide groups are potentially self-crosslinking but the epoxy-amide reaction is very slow and requires large amounts of catalyst to accelerate the curing reaction. Thus, in the invention, a crosslinking agent, i.e., a carboxy terminated polymer is added to the paint binder system.

The copolymers used in this invention contain between about 5 and about 20, preferably between 8 and 15, weight percent of a glycidyl ester of a monoethylenically unsaturated carboxylic acid, e.g., glycidyl acrylate and glycidyl methacrylate. These monomers provide the copolymer with its epoxy functionality. The amide functionality is provided by incorporating in the unsaturated monomer polymerization mix about 2 to about 10 weight percent of an alpha-beta olefinically unsaturated amide, e.g., acrylamide and methacrylamide. The remainder of the copolymer consists essentially of monofunctional, alpha-beta olefinically unsaturated monomers. These can be acrylates or a mixture of acrylates and monovinyl hydrocarbons. Preferably, in excess of fifty weight percent of the copolymer monomers are esters of a $C_1$–$C_8$ monohydric alcohol and acrylic or methacrylic acid, i.e., methyl methacrylate, ethyl acrylate, butyl acrylate, butyl methacrylate, hexyl acrylate, and 2-ethyl hexyl methacrylate. $C_8$–$C_{12}$ monovinyl hydrocarbons such as styrene, vinyl toluene, t-butyl styrene, chlorostyrene and alpha-methyl styrene are suitable for use but preferably comprise less than fifty percent of copolymer. Other vinyl monomers such as vinyl chloride, acrylonitrile, methacrylonitrile, vinyl acetate may be used as modifying monomers. When employed, these comprise between 0 and 30% by weight of the monomer mixture.

The epoxy-functional and amide-functional copolymers used in these coating compositions have a glass transition temperature in the range of 40° C. to 90° C., preferably 50° C. to 80° C., and a molecular weight ($\overline{M}_n$) in the range of about 1500 to about 15,000, preferably about 2500 to about 6000.

In preparing this copolymer, the epoxy-functional monomer, e.g., glycidyl methacrylate, and the amide-functional monomer are mixed with the aforementioned ethylenically unsaturated remainder monomers and reacted by conventional free radical initiated polymerization in such proportions as to obtain the copolymer for the powder coating compositions. Thus, when the preferred ethylenically unsaturated remainder monomers are used with the epoxy-functional monomer and the amide-functional monomer to form the copolymer, the epoxy-functional monomer, e.g., glycidyl methacrylate, is present in the copolymer from about 5 weight percent to about 20 weight percent, the amide-functional monomer, e.g., methacrylamide is present in the copolymer from about 2 to about 10 weight percent, and the remainder monomers are present from about 93 to about 70 weight percent.

Generally, a free radical initiator is needed to induce the polymerization reaction. A large number of free radical initiators are known to the art and are suitable for this purpose. These include benzoyl peroxide, lauryl peroxide, t-butylhydroxyperoxide, acetylcyclohexane sulfonyl peroxide, diisobutyryl peroxide, t-butyl peroctoate, t-butyl perbenzoate, di- (2-ehtylhexyl) peroxydicarbonate, di-isopropyl peroxydicarbonate, t-butylperoxypivalate, decanoyl peroxide, azobis (2-methylpropionitrile), etc. The polymerization is preferably carried out in solution using a solvent in which the epoxy-functional, amide-functional copolymer is soluble. Toluene, xylene, dioxane, butanone, dichloromethane, etc., are suitable solvents for this polymerization.

If the epoxy-functional, amide functional copolymer is prepared in solution, the solid copolymer can be precipitated by pouring the solution at a slow rate into a non-solvent for such copolymer such as hexane, octane or water under a suitable agitation condition. The copolymer thus obtained is further dried so that it contains less than three percent of the materials that volatilize at the temperatures used for baking the coatings.

These copolymers can also be prepared by emulsion polymerization, suspension polymerization, bulk polymerization, or their suitable combinations. In these methods of preparing the copolymers, chain transfer agents may be required to control the molecular weight of the copolymer to a desired range. The solid copolymers obtained by these methods must also be dried to contain less than three percent of the materials that volatilize at the temperatures used for baking the coatings.

For powder coating applications, both molecular weight and molecular weight distribution of the epoxy-functional, amide-functional copolymer are important. While the molecular weight ($\overline{M}_n$) range extends from about 1500 to about 15,000, the copolymer component advisedly does not contain significant amounts of higher molecular weight fractions. No more than 5 percent of the copolymer is advisedly of molecular weight greater than 20,000. The molecular weight distribution as measured by the ratio of weight average molecular weight to number average molecular weight ($\overline{M}_w/\overline{M}_n$) is advisedly in the range of 1.6 to 3.0. The preferred range of molecular weight distribution is in the range of 1.7 to 2.2.

The carboxy-terminated polymeric crosslinking agent advisedly consists essentially of carbon, hydrogen and oxygen and has molecular weight in the range of about 650 to about 3000. It may take the form of a conventional polyester formed from diols and/or triols and a dicarboxylic acid which has been subsequently reacted with a di- or tricarboxylic acid or anhydride or conventional polyester procedure wherein an excess of dicarboxylic acid is used. In another embodiment, the carboxy-terminated polymeric crosslinking agent is a carboxy-terminated epoxy ester. A carboxy-terminated epoxy ester within this molecular or weight range can be prepared by reacting one equivalent weight of an epoxy resin having molecular weight in the range from about 250 to about 2000 with one and a half to three equivalent weights of a saturated, dicarboxylic acid having four to twenty-two carbon atoms per molecule.

Some suitable epoxy resins for forming the carboxy-terminated polymer include: 1,4-butanediol diglycidyl ether and di-(3,4-epoxy-6-methyl cyclohexyl methyl) adipate. Other suitable epoxy resins include those having average molecular weight ranging from about 380 to about 1800 and sold under the trade names of Epon 828, Epon 1001, Epon 1002 and Epon 1004 by Shell Chemical Company. These and other suitable epoxy resins are described in greater detail including formulas and physical characteristics in Modern Surface Coatings, Paul Nylen/Edward Sunderland, Section 5.15 Epoxide resins, pages 197-208, Interscience Publishers, a division of John Wiley and Sons Ltd., London, New York and Sydney, which is incorporated herein by reference.

These epoxy resins are reacted with dicarboxylic acids to produce the carboxy terminated epoxy ester which may be used as one of the crosslinking agents suitable for the powder coating composition of this invention. The dicarboxylic acid and epoxy resin may be either fully reacted to form the crosslinking agent or only semi-reacted to form the crosslinking agent. When the acid and resin are only semi-reacted, the completion of the reaction therebetween takes place during the baking of the powder coating composition to produce a finished coating. The technique of semi-reaction is used when the fully reacted ester is not suitable for powdering and the semi-reacted materials are suitable for powdering. The use of carboxy-terminated polymeric crosslinking agents which are not friable powders, but are viscous liquids, or are difficult to grind, is limited so that the weight percentage of such a crosslinking agent is limited to a minor constituent of the powder. Carboxy terminated, saturated polyesters may also be used as cross-linking agents.

Some of the dicarboxylic acids suitable for reacting with the epoxy resins are as follows: adipic acid, pimelic acid, suberic acid, azelaic acid, sebacic acid, undecandoic acid, and brassylic acid.

If a greater degree of flexibility is desired in the cured powder coating, up to 10% by equivalent weight of the carboxy terminated polymer crosslinking agent may be substituted by a saturated, straight chain, aliphatic, monocarboxylic acid having 10 to 22 carbon atoms per molecule. Some acids suitable for substitution are lauric acid, tridecanoic acid, myristic acid, pentadecanoic acid, palmitic acid, margaric acid and stearic acid.

These powder coating compositions advantageously contain a flow control agent as a part of the powder coating mixture. The flow control agent is advisedly a polymer having a molecular weight ($\overline{M}_n$) of at least 1000 and advantageously comprises at least 0.05 weight percent of the mixture. The flow control agent has a glass transition temperature at least 20° C. below the glass transition temperature of the mixture's copolymer.

One group of suitable flow control agents are acrylic polymers. Preferred acrylic polymers which may be used for the flow control agent are polylauryl acrylate, polybutyl acrylate, poly (2-ethylhexyl acrylate), polylauryl methacrylate and polyisodecyl methacrylate.

The flow control agent may also be a fluorinated polymer having a surface tension, at the baking temperature of the powder, lower than that of the copolymer utilized in the mixture. Preferred flow control agents, if the agent is a fluorinated polymer are esters of polyethyleneglycol or polypropyleneglycol and fluorinated fatty acids. For example, an ester of polyethyleneglycol of molecular weight of over 2500 and perfluoro octanoic acid is a useful flow control agent. Polymeric siloxanes of molecular weight of over 1000 (advantageously 1000 to 20,000) may also be used, e.g., polydimethyl siloxane or polymethylphenyl siloxane.

A coating composition formed in accordance with the teachings of this invention may include a small weight percent of a catalyst in order to increase the crosslinking rate of the powder coating composition at the baking temperature thereof. Baking temperatures will ordinarily be in the range of 130° to 200° C. and the catalyst should produce a gel time for the powder coating composition at the baking temperature to be used which is at least 1 minute but no greater than 20 minutes. This gel time is preferably in the range of 1 to 12 minutes and most preferably between about 2 and about 8 minutes.

Some catalysts which are suitable for use in the powder coating compositions include tetraalkylammonium salts, imidazole type catalyst, tertiary amines and metal salts of organic carboxylic acids. The tetraalkylammonium salt catalysts include the following: tetrabutyl ammonium chloride (bromide or iodide), tetraethyl ammonium chloride (bromide or iodide), trimethylbenzylammonium chloride, dodecyl dimethyl (2-phenoxyethyl) ammonium bromide, diethyl (2-hydroxy ethyl) methyl ammonium bromide. Suitable catalysts of the imidazole type include: 2-methyl-4-ethyl imidazole, 2-methyl imidazole, imidazole, 2 - [(N-benzylanilino) methyl] - 2 - imidazoline phosphate, and 2 - benzyl - 2 - imidazoline hydrochloride. Suitable tertiary amine catalysts for the powder coating compositions of this invention include: triethylenediamine, N,N - diethylcyclohexylamine, and N-methyl morpholine. The metal salts of organic carboxylic acid which are catalysts for the powder coatings of this invention include, but are not limited to: stannous octoate, zinc naphthenate, cobalt naphthenate, zinc octoate, stannous 2 - ethylhexoate, phenylmercuric propionate, lead neodecanoate, dibutyl tin dilaurate and lithium benzoate.

The catalyst used in an individual powder coating composition is generally solid at room temperature and has a melting point of from 50° C. to 200° C.

Conventional non-metallic and metallic pigments can be used with these powder coating compositions. Such are conventionally employed in an amount such as to constitute between about 2 and about 45 weight percent of the total mixture depending on the pigment selected and the gloss required for the baked coating.

Since individual powder coating compositions of this invention can be applied to an article to be painted by electrostatic methods, one may desire to include a small weight percentage of an antistatic agent in such compositions. In particular, the antistatic agent is included in a range from 0.05 weight percent of the total powder composition. Suitable antistatic agents include, but are not limited to, tetraalkylammonium salts as discussed previously and which also serve as catalysts. Other suitable antistatic agents include: alkyl poly (ethyleneoxy) phosphate or alkylaryl poly (ethyleneoxy) phosphate; poly(ethyleneimine), poly (2-vinyl pyrollidone), pyridinium chloride, poly (vinyl pyridium chloride), poly(vinyl alcohol) or inorganic salts.

A plasticizer may be used in a powder coating composition of this invention if desired. The type of plasticizers used very often include adipates, phosphates, phthalates, sebacates, polyesters derived from adipic acid or azelaic acid. Some of these plasticizers are: dihexyl adipate, diisooctyl adipate, dicyclohexyl adipate, triphenylphosphate, tricresylphosphate, tributylphosphate, dibutylphthalate, dioctylphthalate, butyl octyl phthalate, dioctyl sebacate, butyl benzyl sebacate, dibenzyl sebacate, butanediol - 1,4 - diglycidyl ether, diglycidyl ether of bisphenol A and its polymers and cellulose acetate butyrate.

Having described the various materials which are employed in formulating the powder coating compositions of this invention, a plurality of examples are hereinafter set forth to illustrate various individual powder coating compositions.

EXAMPLE 1

An epoxy-functional, amide-functional copolymer is prepared from the below listed components in the manner hereinafter described.

| Reactants | Amounts, gms. | Percent By Weight of Total Reactants |
|---|---|---|
| glycidyl methacrylate | 45 | 15 |
| acrylamide | 15 | 5 |
| butyl methacrylate | 111 | 37 |
| methyl methacrylate | 129 | 43 |

The above mentioned monomers are admixed in the preportions above set forth and 11.0 grams of 2,2' - azobis - (2-methylpropionitrile), hereinafter called AIBN, are added to the mixture. The mixture is slowly added to 200 ml. of toluene heated to 80°–90° C. which is being stirred vigorously under a nitrogen atmosphere. A condenser is provided at the top of the toluene container to condense the toluene vapors and return the condensed toluene to the container. The monomer mixture is added through a regulating valve and the rate of addition is controlled to maintain a reaction temperature of 90°–110° C. with the rest of the heat supplied from an external heater. After the addition of the monomer mixture is completed (3 hours), 0.8 grams of AIBN dissolved in 10 ml acetone is added over a one half ($\frac{1}{2}$) hour period and refluxing is continued for two additional hours.

The resultant toluene - polymer solution is diluted with 200 mls. acetone and coagulated in 2 liters of hexane. The white powder is dried in the vacuum over at 55° C. for 24 hours. Its molecular weight is determined to be $M_w/M_n = 6700/3200$ and WPE (molecular weight per epoxide group) is about 1000.

A polymer, hereinafter called carboxy terminated polymer A, is made in the following manner. Five hundred grams of a commercially available epoxy resin, Epon 1001, (epoxide equivalent 450–525, melting range, 64°–76° C., molecular weight average 900), is charged into a 500 ml stainless steel beaker having a heating mantle. The epoxy resin is heated to 110° C. As the epoxy resin is stirred, 194 grams of azelaic acid is added. After a reaction time of 30 minutes, a homogeneous mixture is obtained. The mixture resin, only semi-reacted, is poured out into an aluminum pan and cooled. The solid mixture is pulverized to pass through a 100 mesh screen by use of a blender. The mixture resin is only semi-reacted because if fully reacted it could not be powdered. A portion of the carboxy terminated polymer is weighed out for making a powder coating composition of this invention.

One hundred parts by weight of the ground copolymer are mixed with the following materials:

| Carboxy-terminated polymer | 73 parts |
|---|---|
| Tetrabutyl ammonium bromide | 0.2 parts |
| Polylauryl acrylate ($M_n$-10,000) | 0.5 parts |
| Titanium dioxide | 30 parts |

The materials are mixed together in a ball mill for 2 hours. The mixture is milled rolled at 85° C. to 90° C. for 5 minutes. The solid obtained is ground in a ball mill to pass through a 140 mesh screen.

The resulting powder thus obtained is a powder coating composition of the invention. The powder is sprayed on an electrically grounded, steel panel by using electrostatic powder spray gun operating at 50 KV charging voltage. After spraying, the panel is heated at 170° C. for 20 minutes.

The coating obtained on the panel has good adhesion to the steel panel and good impact strength. The coating also is applied to and has good adhesion on panels of glass, brass, zinc, aluminum, copper and bronze. The coating obtained is not soluble in toluene, gasoline, butanone or methanol.

EXAMPLE 2

The procedure of Example 1 is repeated except for the differences that in the preparation of the copolymer (a) an equimolar amount of methacrylamide is substituted for the acrylamide and (b) an equimolar amount of glycidyl acrylate is substituted for the glycidyl methacrylate.

EXAMPLE 3

An epoxy-functional, amide-functional copolymer is prepared from the below listed components in the manner hereinafter described:

| Reactants | Percent By Weight of Total Reactants |
|---|---|
| glycidyl methacrylate | 10 |
| methacrylamide | 5 |
| butyl methacrylate | 45 |
| methyl methacrylate | 40 |

These monomers are admixed. AIBN in the amount of 6 percent of the total mixture is dissolved in 5.0 ml acetone and added to the monomer mixture. These monomers are reacted using the procedure of Example 1 and an epoxy-functional, amide-functional copolymer is formed. This copolymer has a glass transition temperature (Tg) of 53.

A polymer, hereinafter called carboxy-terminated polymer B, is made in the following manner. One hundred ninety five grams of a commercially available epoxy resin, Epon 1002 (epoxide equivalent 650), is charged into a 500 ml stainless steel beaker having a heating mantle. The epoxy resin is heated until it is melted. As the epoxy resin is stirred, 60 grams of azelaic acid and 0.5 grams of tetrabutylammonium iodide is added. The time of addition is 30 minutes and the stirring is maintained so that a homogeneous mixture is obtained. The resin mixture is then poured into an aluminum pan and cooled. The solid carboxy terminated epoxy ester is pulverized by a mechanical blender to pass through a 100 mesh screen. A portion of this carboxy terminated polymer is weighed out for making a powder coating composition of this invention.

One hundred parts of the copolymer produced is mixed with the same additional ingredients set forth in Example 1, except that 43 parts by weight of carboxy-terminated polymer B is substituted for the 73 parts by weight of carboxy-terminated polymer A. The quality of the painted panels obtained after application of the powder coating to various materials is about the same as achieved in Example 1.

EXAMPLE 4

An epoxy-functional, amide-functional copolymer is prepared from the below listed components in the manner hereinafter described:

| Reactants | Grams | Percent By Weight of Total Reactants |
|---|---|---|
| glycidyl methacrylate | 195 | 13 |
| acrylamide | 75 | 5 |
| butyl methacrylate | 630.0 | 42 |
| methyl methacrylate | 600.0 | 40 |

These monomers are admixed. AIBN in the amount of 67.0 grams (4.5%) is dissolved in 100 mls. of acetone and added to the monomer mixture. The monomers are reacted as in Example 1 in order to produce the copolymer.

A polymer, hereinafter called carboxy-terminated polymer C, is prepared as in Example 3 except that 650 grams of a commercially available epoxy resin, Epon 1002 (epoxy equivalent 852) and 202 grams of sebacic acid are reacted. One hundred parts of the copolymer are mixed with the same additional ingredients described in Example 1, except 72 parts of the carboxy terminated polymer C are substituted for the carboxy terminated polymer A used in Example 1.

The powder coating composition obtained by the preceding process steps is applied to test panels in the same manner as described in Example 1. The coating is baked at a temperature of 170° C. for 30 minutes. The coating obtained has good adhesion to steel, glass, brass, zinc, aluminum, copper and bronze.

EXAMPLE 5

An epoxy-functional, amide-functional copolymer is prepared from the following components in the manner hereinafter set forth:

| Reactants | Grams | Percent By Weight of Total Reactants |
|---|---|---|
| glycidyl methacrylate | 20.0 | 15 |
| methacrylamide | 6.0 | 3 |
| butyl methacrylate | 94.0 | 42 |
| methyl methacrylate | 80 | 40 |

AIBN in the amount of 11.0 grams (5.5%) are dissolved in 25 ml acetone and added to the monomer mixture. The monomers are reacted as in Example 1 to produce an epoxy-functional, amide-functional copolymer.

This copolymer is isolated as in Example 1 and compounded with the same amounts of the same materials as in Example 1 using a Brabender Plasticorder extruder at 110° C. The resulting coating on steel panels is glossy and has good solvent resistance. These coatings exhibit good adhesion and impact strength. No solvent marks are present after dipping the coated panels in toluene, xylene or methyl ethyl ketone for 1 minute.

EXAMPLE 6

The procedure of Example 5 is repeated except for the difference that a functionally equivalent amount of a carboxy-terminated polyester hereinafter described is substituted for carboxy-terminated polymer A. This polyester resin is prepared from 428 parts by weight of propylene glycol, 677 parts by weight of isophthalic acid, 143 parts by weight pelargonic acid, and 433 parts by weight of trimellitic anhydride. All reactants except the trimellitic anhydride are charged to a two liter reaction flask equipped with stirrer, thermometer, pack column, and an inert gas sparge. The components are melted and reacted at 400° F. for about two hours to clarity and to the removal of 163 parts by weight of water of reaction. The trimellitic anhydride is then added and allowed to react to a final acid number of 108. This polyester has a melting range of about 70°–78° C.

EXAMPLE 7

A monomer mixture having the following composition is prepared: glycidyl methacrylate 20% by weight, acrylamide 2% by weight, isobutyl acrylate 25% by weight, butyl methacrylate 15% by weight, and methyl methacrylate 38% by weight. The monomer mixture is reacted as in Example 1 and using four percent by weight of the reaction initiator is employed in reacting the monomer mixture to form the copolymer.

One hundred (100) parts by weight of this copolymer is added to 50 parts by weight of a carboxy terminated polyester prepared in the following manner: 818 parts by weight of adipic acid and 378 grams of 1,4 - butanediol to a two liter, 3-neck flask equipped with inert gas sparge, stirrer, thermometer and pack column. The reaction mix is heated to 400° F. The reaction is allowed to continue until the acid number is 160. The resultant polyester is then poured out on aluminum foil and allowed to cool to a white waxy solid having a melting range of about 32° to 38° C.

EXAMPLE 8

The procedure of Example 7 is repeated except for the differences (1) that the copolymer consists of glycidyl methacrylate 20% by weight, methacrylamide 10% by weight, butyl methacrylate 30% by weight and methyl methacrylate 40% by weight and (2) the carboxy-terminated polyester is prepared in the following manner: 671 parts by weight of trimethylpentanediol, 149 parts by weight of trimethylolethane, 774 parts by weight of isophthalic acid, and 97 parts by weight of adipic acid. All reactants except the adipic acid are charged to the reactor. The components are melted and reacted to clarity. Adipic acid is then added and allowed to react to a final acid number of 58. This polyester has a melting range of about 60° to 66° C. In this example, 135 parts of the polyester is combined with 100 parts of the copolymer in the powder coating composition.

EXAMPLE 9

The procedure of Example 7 is repeated except for the differences that (1) the copolymer is formed from glycidyl methacrylate 20% by weight, acrylamide 2% by weight, butyl acrylate 20% by weight and methyl methacrylate 58% by weight, (2) seven (7%) percent by weight of the reaction initiator is employed in reacting the monomer mixture form the copolymer and (3) 100 parts by weight of carboxy-terminated polymer A are compounded with the other components. The molecular weight of the copolymer ($\overline{M}_n$) is about 1500.

EXAMPLE 10

The procedure of Example 7 is repeated except for the differences that (1) 80 parts by weight of carboxy-terminated polymer A are used in making the powder coating composition, (2) 1.0 parts by weight of stannic chloride is added to the powder coating composition, and (3) the coatings are baked at 160° C. for 15 minutes. The coatings obtained have good adhesion to steel and a variety of other substrates. These coatings also demonstrate good solvent resistance.

EXAMPLE 11

The procedure of Example 1 is repeated except for the difference that the copolymer is prepared from the following monomers:

| Reactants | Percent By Weight of Total Reactants |
|---|---|
| glycidyl methacrylate | 15 |
| acrylamide | 5 |
| methacrylonitrile | 5 |
| alpha methyl styrene | 5 |
| butyl methacrylate | 35 |
| methyl methacrylate | 35 |

EXAMPLE 12

The procedure of Example 1 is repeated except for the difference that the copolymer is prepared from the following monomers:

| Reactants | Percent By Weight of Total Reactants |
|---|---|
| glycidyl methacrylate | 10 |
| methacrylamide | 5 |
| acrylonitrile | 10 |
| vinyl acetate | 5 |
| butyl methacrylate | 30 |
| methyl methacrylate | 40 |

EXAMPLE 13

The procedure of Example 1 is repeated except for the difference that the copolymer is prepared from the following monomers:

| Reactants | Percent By Weight of Total Reactants |
|---|---|
| glycidyl methacrylate | 15 |
| acrylamide | 5 |
| vinyl chloride | 5 |
| acrylonitrile | 10 |
| ethyl acrylate | 5 |
| butyl methacrylate | 25 |
| methyl methacrylate | 35 |

EXAMPLE 14

The procedure of Example 1 is repeated except for the difference that an equivalent amount of polylauryl acrylate ($\overline{M}_n = 10,000$) is substituted for the poly (2-ethylhexyl acrylate).

EXAMPLE 15

The procedure of Example 1 is repeated except for the difference that an equivalent amount of polybutylacrylate ($\overline{M}_n = 9000$) is substituted for the poly (2-ethylhexyl acrylate).

EXAMPLE 16

The procedure of Example 1 is repeated except for the difference that an equivalent amount of polylaurylmethacrylate ($\overline{M}_n = 6000$) is substituted for the poly (2-ethylhexylacrylate).

EXAMPLE 17

The procedure of Example 1 is repeated except for the difference that an equivalent amount of polyethylene perfluoro octonoate ($\overline{M}_n = 3400$) is substituted for the poly (2-ethylhexyl acrylate).

EXAMPLE 18

The procedure of Example 1 is repeated except for the difference that an equivalent amount of polyisodecyl methacrylate is substituted for the poly (2-ethylhexyl acrylate).

Many modifications of this invention will be apparent to those skilled in the art in view of this specification. It is intended that all such modifications which fall within the scope of this invention be included within the appended claims:

We claim:

1. In a thermosettable powder paint which exclusive of pigments, catalysts, antistatic agents, plasticizers and flow control agents, the same being conventional nonreactive additive to a thermosettable powder paint, consists essentially of a coreactive particulate mixture of
    (A) a copolymer consisting essentially of about 5 to about 20 weight percent of a glycidyl ester of a monoethylenically unsaturated carboxylic acid and about 80 to about 95 weight percent of other monoethylenically unsaturated monomers, and having a glass transition temperature in the range of about 40° C. to about 90° C. and a molecular weight ($\overline{M}_n$) in the range of about 1500 to about 15,000 and
    (B) as crosslinking agent, a carboxy-terminated compound selected from the group consisting of carboxy-terminated epoxy esters and carboxy-terminated polyesters and having molecular weight in the range of about 650 to about 3000,
the improvement wherein said copolymer is qualitatively difunctional and said other monoethylenically unsaturated monomers consist essentially of difunctional monomers selected from the group consisting of acrylamide and methacrylamide in an amount comprising about 2 to about 10 weight percent of said copolymer and monoethylenically unsaturated monomers consisting essentially of monofunctional monomers selected from the group consisting of esters of a $C_1$-$C_8$ monohydric alcohol and acrylic acid, esters of a $C_1$-$C_8$ monohydric alcohol and methacrylic acid and $C_8$-$C_{12}$ monovinyl hydrocarbons.

2. A powder paint in accordance with claim 1 wherein above 50 weight percent of said monofunctional monomers are acrylates and methacrylates.

3. A powder paint in accordance with claim 1 wherein said copolymer has molecular weight ($\overline{M}_n$) in the range of about 2,500 to about 6,000.

4. A powder paint in accordance with claim 1 wherein said glycidyl ester of a monoethylenically unsaturated acid is selected from glycidyl acrylate and glycidyl methacrylate.

* * * * *